United States Patent
Maeda

(10) Patent No.: US 7,607,104 B2
(45) Date of Patent: Oct. 20, 2009

(54) DATA PROCESSING METHOD, DATA PROCESSOR, AND PROGRAM

(75) Inventor: Makiko Maeda, Itabashi-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 11/536,445

(22) Filed: Sep. 28, 2006

(65) Prior Publication Data

US 2007/0220209 A1    Sep. 20, 2007

(30) Foreign Application Priority Data

Oct. 24, 2005    (JP)    ............... 2005-308973

(51) Int. Cl.
*G06F 3/048* (2006.01)
(52) U.S. Cl. ..................... 715/772; 715/859
(58) Field of Classification Search ................ 715/734, 715/736, 772, 859, 801, 848, 850
See application file for complete search history.

(56) References Cited

U.S. PATENT DOCUMENTS 6,344,859 B1 * 2/2002 Alimpich et al. ............ 715/762
6,785,487 B2    8/2004 Maeda et al.
7,290,221 B2 * 10/2007 Anderson et al. ........... 715/848

FOREIGN PATENT DOCUMENTS

JP    2005007651 A    1/2005

* cited by examiner

*Primary Examiner*—Weilun Lo
*Assistant Examiner*—Truc T Chuong
(74) *Attorney, Agent, or Firm*—Canon U.S.A., Inc., IP Division

(57) ABSTRACT

An apparatus performs a data processing, including a data layout processing, to generate processed data. When the data processing has been completed, the apparatus performs a data output processing for outputting the processed data. The apparatus is further configured to output a current progress status of a processing that includes the data processing and the data output processing.

16 Claims, 12 Drawing Sheets

FIG. 3

| PROCESSING NAME | PROPORTION |
|---|---|
| DATA ACQUISITION PROCESSING | 0.05 |
| DATA MERGE PROCESSING | 0.1 |
| LAYOUT PROCESSING | 0.3 |
| RENDERING PROCESSING | 0.15 |
| JOB EXECUTION INSTRUCTION PROCESSING | 0.4 |

DATA PROCESSING METHOD, DATA PROCESSOR, AND PROGRAM

BACKGROUND OF THE INVENTION

1. Field of the Invention

The present invention generally relates to a data processing method, a data processor, and a program. In particular, the present invention relates to a method and an apparatus capable of providing progress information relating to a processing being executed.

2. Description of the Related Art

When a user performs some sort of processing on a computer, a progress bar may be displayed on a display screen to allow a user to know the progress status of the processing being executed. This progress bar gives the user an indication of how much progress has been made or how long the processing will take. On the other hand, a user can similarly know the progress status of each job performed in an embedded device such as a digital multifunction machine via a PC display or the embedded device's display. Conventional techniques that allow an easy grasp of the progress status of each job are as follows.

Japanese Patent Laid-Open No. 2005-7651 discloses a technique in which a progress meter indicates how much of the entire print processing has been completed. U.S. Pat. No. 6,785,487 discloses a technique that enables a user to grasp the progress statuses of a plurality of different jobs via the same screen.

Currently, an application can be operated in an embedded device such as a digital multifunction machine. It is desirable that a user can check the progress status of an application executed on an embedded device as in the case where an application is operated on a PC.

However, the processing flow of an application operated in a digital multifunction machine includes the execution of a job. In this case, if execution units for the application and the job are individually present, the progress status in the application execution unit and the progress status in the job execution unit are required to be separately displayed. Therefore, it is difficult for a user to determine how much of all the processings have been completed.

SUMMARY OF THE INVENTION

According to an embodiment of the present invention, a user can determine a current progress status of a processing that includes a data processing and a data output processing, the data processing including a data layout processing.

According to an aspect of the present invention, a method is provided that includes: performing a data processing, including a data layout processing, to generate processed data; outputting the processed data; and outputting a current progress status of a processing including the data processing and the outputting of the processed data.

According to another aspect of the present invention, an apparatus is provided that includes: a data processing unit configured to perform a data processing, including a data layout processing, to generate processed data; a data output unit configured to output the processed data; and a progress output unit configured to output a current progress status of a processing including the data processing that is performed by the data processing unit and the outputting of the processed data performed by the data output unit.

According to another aspect of the present invention, a computer-readable medium is provided that stores instruction which, when executed by an apparatus, causes the apparatus to perform operations including: performing a data processing, including a data layout processing, to generate processed data; outputting the processed data; and outputting a current progress status of a processing including the data processing and the outputting of the processed data.

Further features of the present invention will become apparent from the following description of exemplary embodiments with reference to the attached drawings.

BRIEF DESCRIPTION OF THE DRAWINGS

FIG. 3 is a diagram showing an exemplary table of proportions according to the first embodiment of the present invention.

DESCRIPTION OF THE EMBODIMENTS

Exemplary embodiments of the present invention will be described in detail with reference to the accompanying drawings.

First Embodiment

Figure 1:
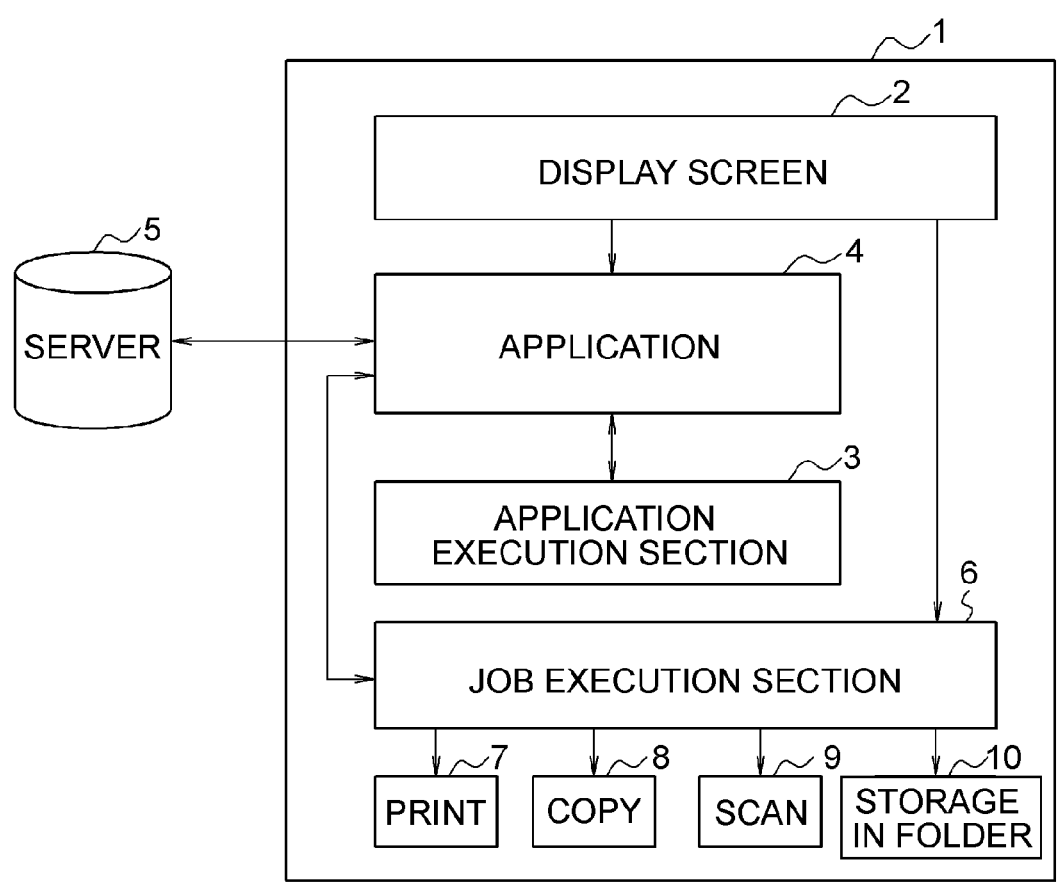
FIG. 1 is a diagram showing a configuration of a progress display system according to a first embodiment of the present invention.

First, the first embodiment of the present invention will be described with reference to FIGS. 1 through 6E. FIG. 1 is a diagram showing a configuration of a progress display system according to the first embodiment of the present invention.

A progress display system 1 is provided with the following: a display screen 2; an application execution section 3; an application 4; and a job execution section 6. A UI screen for the application 4 is displayed on the display screen 2. The application execution section 3 operates the application 4.

The application 4 transmits or receives data to or from an external server 5 and transmits generated data to the job execution section 6.

The job execution section 6 receives an instruction from the display screen 2 (e.g., via a touch-sensitive screen) or the application 4 and executes and processes a print job 7, a copy job 8, a scan job 9, or a storage job 10 for storing data in the folder of the progress display system 1 that serves as a digital multifunction machine.

Figure 2:
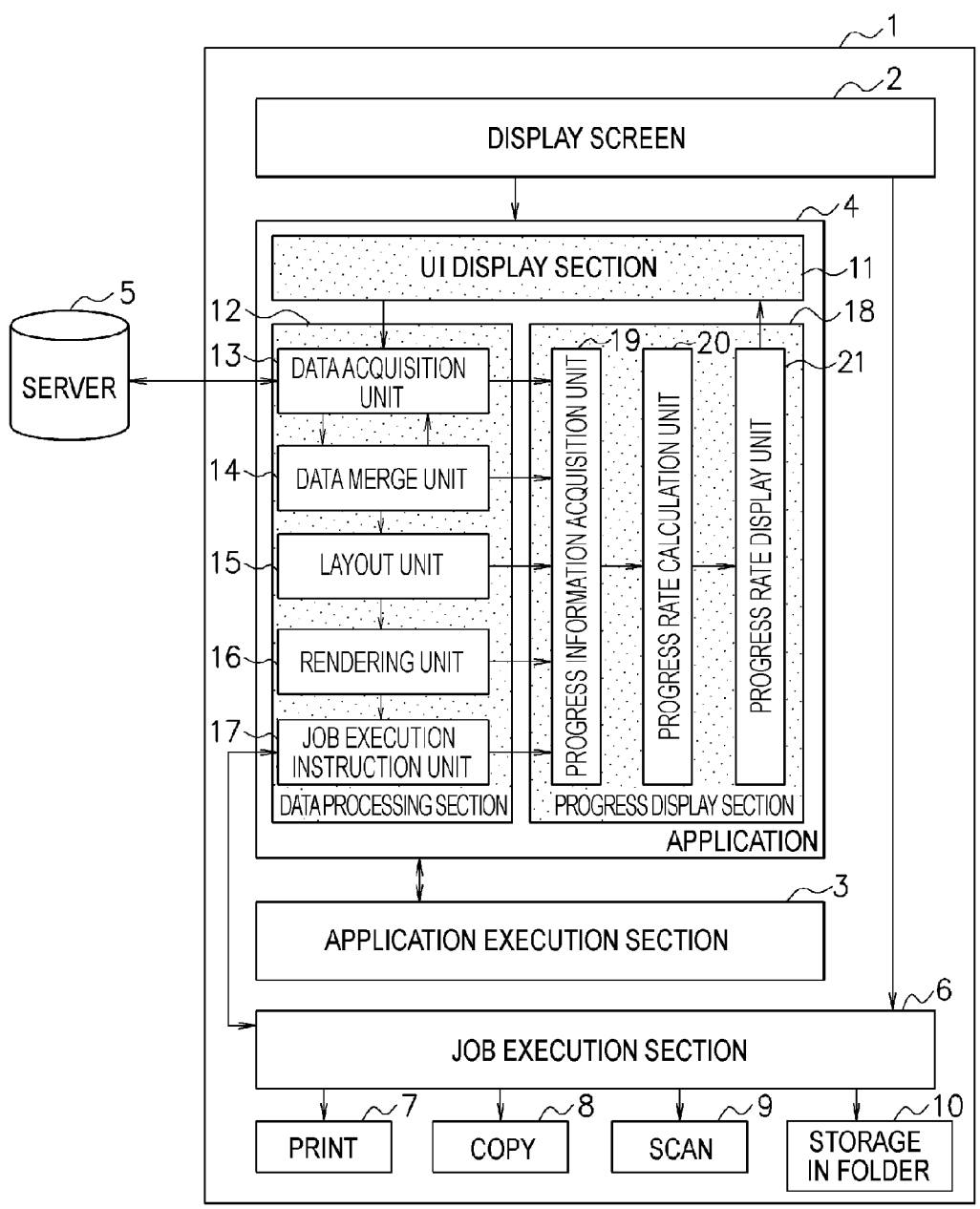
FIG. 2 is a diagram showing details of the internal configuration of an application included in the progress display system according to the first embodiment of the present invention.

FIG. 2 is a diagram showing details of the internal configuration of the application 4 included in the progress display system 1 according to the first embodiment of the present invention.

The application 4 is provided with a UI display section 11, a data processing section 12, and a progress display section 18. The UI display section 11 displays a UI screen for a user's operation. The data processing section 12 performs a data generation processing by externally acquiring data and merging the acquired data with predetermined layout information so as to execute a job. That is, the data processing section 12 performs a data acquisition processing and a data merge processing as will be described later.

The data processing section 12 is provided with the following: a data acquisition unit 13; a data merge unit 14; a layout unit 15; a rendering unit 16; and a job execution instruction unit 17.

The data acquisition unit 13 acquires data from the external server 5.

The data merge unit 14 merges data transmitted from the data acquisition unit 13 with a layout information file.

The layout unit 15 performs a layout processing upon data transmitted from the data merge unit 14.

The rendering unit 16 performs a rendering processing upon data transmitted from the layout unit 15.

The job execution instruction unit 17 outputs data transmitted from the rendering unit 16 to the job execution section 6.

The progress display section 18 displays the progress statuses of all the processings performed in the progress display system 1. The progress display section 18 is provided with a progress information acquisition unit 19, a progress rate calculation unit 20, and a progress rate display unit 21.

The progress information acquisition unit 19 acquires progress information from each unit included in the data processing section 12 and transmits the acquired progress information to the progress rate calculation unit 20.

The progress rate calculation unit 20 calculates a current progress rate on the basis of the progress information transmitted from the progress information acquisition unit 19, and transmits information about the calculated progress rate to the progress rate display unit 21.

The progress rate display unit 21 displays the current progress rate on the basis of the information transmitted from the progress rate calculation unit 20.

That is, each section and unit of the application 4 shown in FIG. 2 shows a corresponding one of the processings performed by the application 4. That is, the processings performed by the application 4 are three processings, a processing performed in the UI display section 11, a processing performed in the data processing section 12, and a processing performed in the progress display section 18. The processing performed in the data processing section 12 includes processings performed in the data acquisition unit 13, the data merge unit 14, the layout unit 15, the rendering unit 16, and the job execution instruction unit 17. The processing performed in the progress display section 18 includes processings performed in the progress information acquisition unit 19, the progress rate calculation unit 20, and the progress rate display unit 21.

FIG. 3 is a diagram showing an exemplary table of proportions according to the first embodiment of the present invention. This table of proportions shows the proportions of processing times taken to perform the internal processings of the data processing section 12 and the processing of the job execution section 6 to the total processing time. This table of proportions is created in advance by a user (or the creator of the application 4) and is stored in the progress rate calculation unit 20. The progress display section 18 displays a progress status using the table of proportions.

First, the processing of the progress information acquisition unit 19 included in the progress display section 18 according to the first embodiment will be described. The progress information acquisition unit 19 acquires progress information from each processing unit of the data processing section 12 (the data acquisition unit 13, data merge unit 14, layout unit 15, rendering unit 16, and job execution instruction unit 17), and transmits the acquired progress information to the progress rate calculation unit 20.

Figure 4:
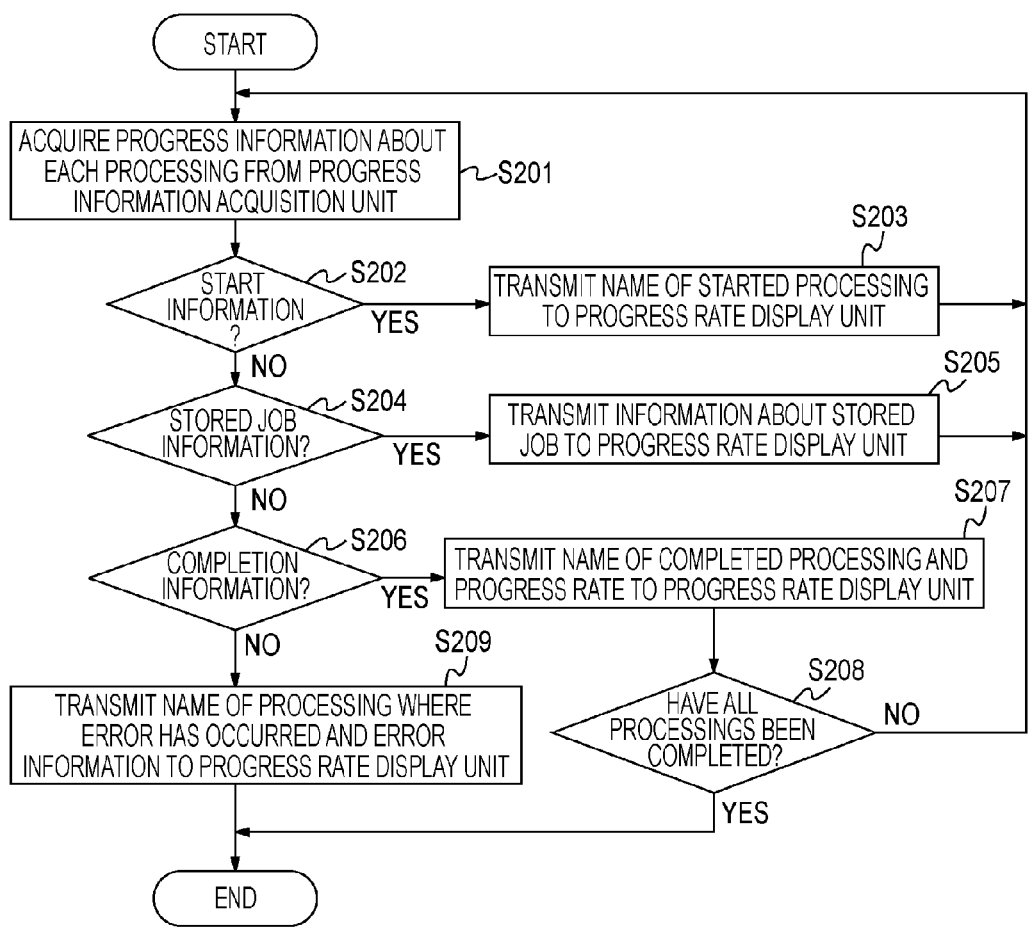
FIG. 4 is a flowchart showing a process performed by a progress rate calculation unit included in a progress display section according to the first embodiment of the present invention.

FIG. 4 is a flowchart showing a process performed by the progress rate calculation unit 20 included in the progress display section 18 according to the first embodiment of the present invention. The progress rate calculation unit 20 acquires the progress information about the processing performed in each processing unit of the data processing section 12 (the data acquisition unit 13, data merge unit 14, layout unit 15, rendering unit 16, and job execution instruction unit 17) from the progress information acquisition unit 19 (step S201). If the acquired progress information is start information (Yes in step S202), the progress rate calculation unit 20 transmits the name of the started processing to the progress rate display unit 21 (step S203). If the acquired progress information is stored job information (Yes in step S204), the progress rate calculation unit 20 transmits the contents of the stored job to the progress rate display unit 21 (step S205).

If the acquired progress information is completion information (Yes in step S206), the progress rate calculation unit 20 calculates a progress rate on the basis of information in the table of proportions (FIG. 3), and transmits the calculated progress rate and the name of the completed processing to the progress rate display unit 21 (step S207). If all the processings have been completed (Yes in step S208), the process ends. If all the processings have not been completed (No in step S208), the information acquisition processing is repeated.

If the acquired progress information is neither the start information, the stored job information, nor the completion information (No in step S206), the acquired progress information can be considered to be error information. Accordingly, the progress rate calculation unit 20 transmits the name of the processing where the error has occurred and the error information to the progress rate display unit 21 (step S209), and then the process ends.

Figure 5:
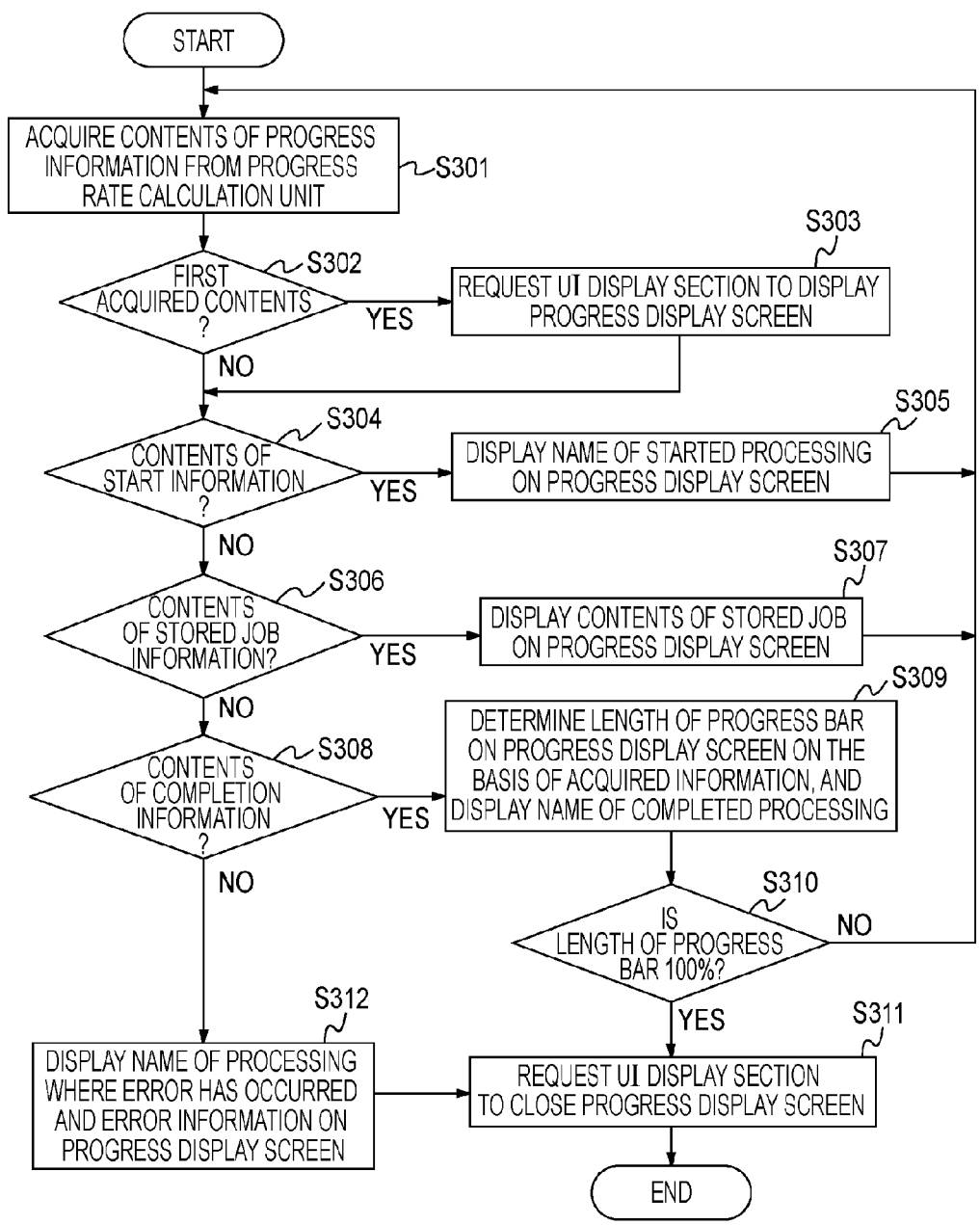
FIG. 5 is a flowchart showing a process performed by a progress rate display unit included in the progress display section according to the first embodiment of the present invention.

FIG. 5 is a flowchart showing a process performed by the progress rate display unit 21 according to the first embodiment of the present invention. The progress rate display unit 21 acquires the contents of progress information from the progress rate calculation unit 20 (step S301). If it is the first time the progress rate display unit 21 has acquired the contents of progress information (Yes in step S302), the progress rate display unit 21 requests the UI display section 11 to display a progress display screen (step S303). If it is not the first time the progress rate display unit 21 has acquired the contents of progress information (No in step S302), and if the acquired contents of progress information are the contents of start information (that is, the name of a started processing) (Yes in step S304), the progress rate display unit 21 displays the name of the started processing on the progress display screen (step S305).

If the acquired contents of progress information are the contents of stored job information (Yes in step S306), the progress rate display unit 21 displays the contents of the stored job on the progress display screen (step S307). If the acquired contents of progress information are the contents of completion information (that is, the name of a completed processing and a progress rate) (Yes in step S308), the progress rate display unit 21 determines the length of a progress bar on the progress display screen on the basis of the acquired information (the progress rate), and displays the name of the completed processing (step S309). In addition, if the length of the progress bar reaches 100% (Yes in step S310), the progress rate display unit 21 requests the UI display section 11 to close the progress display screen after a predetermined time has elapsed (step S311), and then the process ends.

If the acquired contents of progress information are neither the contents of the start information, the stored job information, nor the completion information (No in step S308), the acquired contents of progress information can be considered to be the contents of error information. Accordingly, the progress rate display unit 21 displays the name of the processing where the error has occurred and the error information on the progress display screen (step S312), and requests the UI display section 11 to close the progress display screen after a predetermined time has elapsed (step S311), and then the process ends.

Figure 6A:
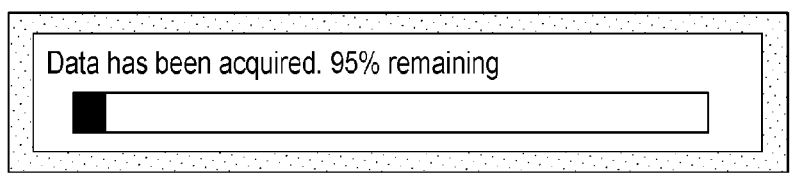
FIGS. 6A through 6E are diagrams showing exemplary progress display screens according to the first embodiment of the present invention.
Figure 6B:
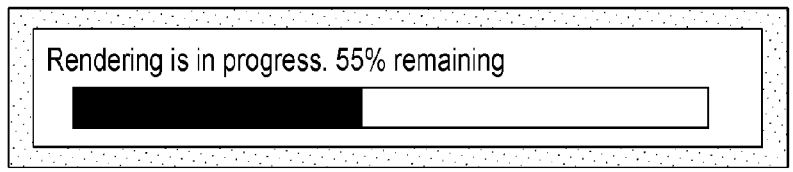
Figure 6C:
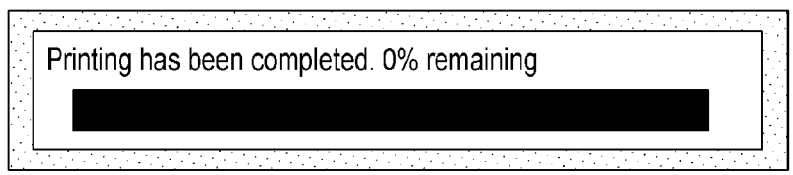

FIGS. 6A through 6E are diagrams showing exemplary progress display screens according to the first embodiment of the present invention. FIG. 6A is a progress display screen shown when data acquisition has been completed. Referring back to the table of proportions shown in FIG. 3, the proportion of the data acquisition is 0.05. Accordingly, the completion of the data acquisition means that 5% of all the processings have been completed, and the message "95% remaining" is displayed. FIG. 6B is a progress display screen shown while the rendering processing is performed. Referring back to the table of proportions shown in FIG. 3, the sum of proportions of the data acquisition processing, the data merge processing, and the layout processing, which have been completed before the rendering processing, is 0.45. Accordingly, the message "55% remaining" is displayed. FIG. 6C is a progress display screen shown when all the processings have been completed. Since the length of the progress bar has reached 100%, the progress display screen is closed after a predetermined time has elapsed.

Figure 6D:
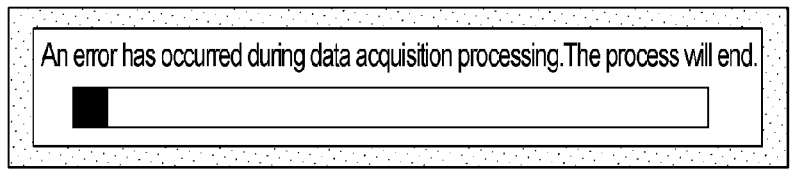
Figure 6E:
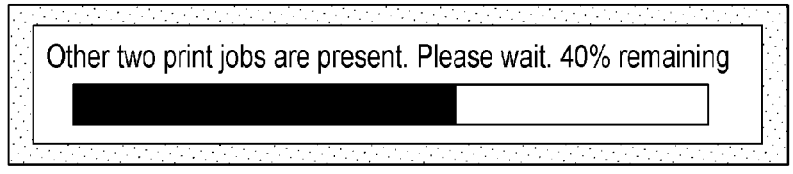

FIG. 6D is a progress display screen shown when an error has occurred during the data acquisition processing. In this case, the progress display screen is also closed after a predetermined time has elapsed. FIG. 6E is a progress display screen shown when there is stored job information in the job execution section 6. Since processings other than the processing to be performed by the job execution section 6 have been completed, the message "40% remaining" is displayed with reference to the table of proportions shown in FIG. 3. This state lasts until the stored jobs are completed.

Second Embodiment

Next, the second embodiment of the present invention will be described. In the above-described first embodiment, the time taken to complete each processing is determined by referring to the table of proportions shown in FIG. 3 which was made in advance by a software developer or a user. However, the time taken to complete each processing can differ depending on data to be processed, for example, the amount of data to be acquired, and the complex layout information, and therefore the proportion of the corresponding processing time to the total processing time can also differ.

In the second embodiment, the case will be described where the time taken to complete each processing is predicted by referring to past information about data processing performed in the past, and an overall progress status is displayed on the basis of the prediction.

The second embodiment of the present invention will be described with reference to FIGS. 7 through 9. In the following description of the second embodiment, portions similar to or same as those described in the first embodiment will be omitted.

Figure 7:
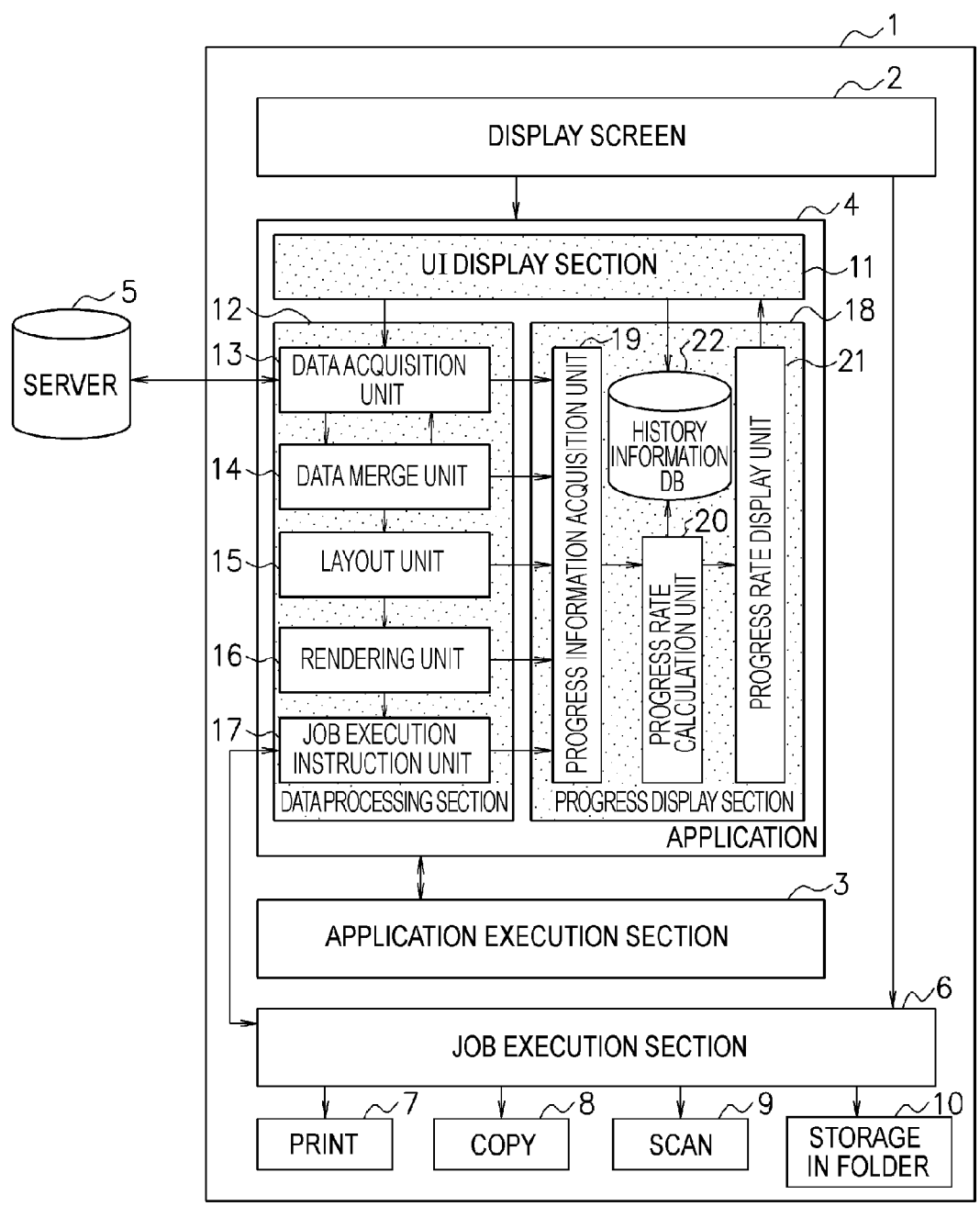
FIG. 7 is a diagram showing a configuration of a progress display system according to a second embodiment of the present invention.

FIG. 7 is a diagram showing a configuration of a progress display system according to the second embodiment of the present invention. The descriptions of the progress display system 1, display screen 2, application execution section 3, application 4, server 5, job execution section 6, print job 7, copy job 8, scan job 9, and storage job 10 have been given with reference to FIG. 1. The descriptions of the data processing section 12, data acquisition unit 13, data merge unit 14, layout unit 15, rendering unit 16, job execution instruction unit 17, progress display section 18, and progress information acquisition unit 19 have been given with reference to FIG. 2.

The UI display section 11 included in the application 4 displays a UI screen for a user's operation, and stores the ID of data that a user has specified as an object to be executed and the date and time when the data has been executed in a history information database 22 included in the progress display section 18.

The progress rate calculation unit 20 included in the progress display section 18 calculates a current progress rate on the basis of information transmitted from the progress information acquisition unit 19, and transmits information about the calculated progress rate to the progress rate display unit 21. In addition, the progress rate calculation unit 20 extracts information about the time taken to complete each processing and the total time of all the processings from information transmitted from the progress information acquisition unit 19, and stores the extracted information in the history information database 22.

The history information database 22 stores the ID of the executed data, information about the execution date and time thereof, and information about the time taken to complete the processing of the data.

Figure 8:
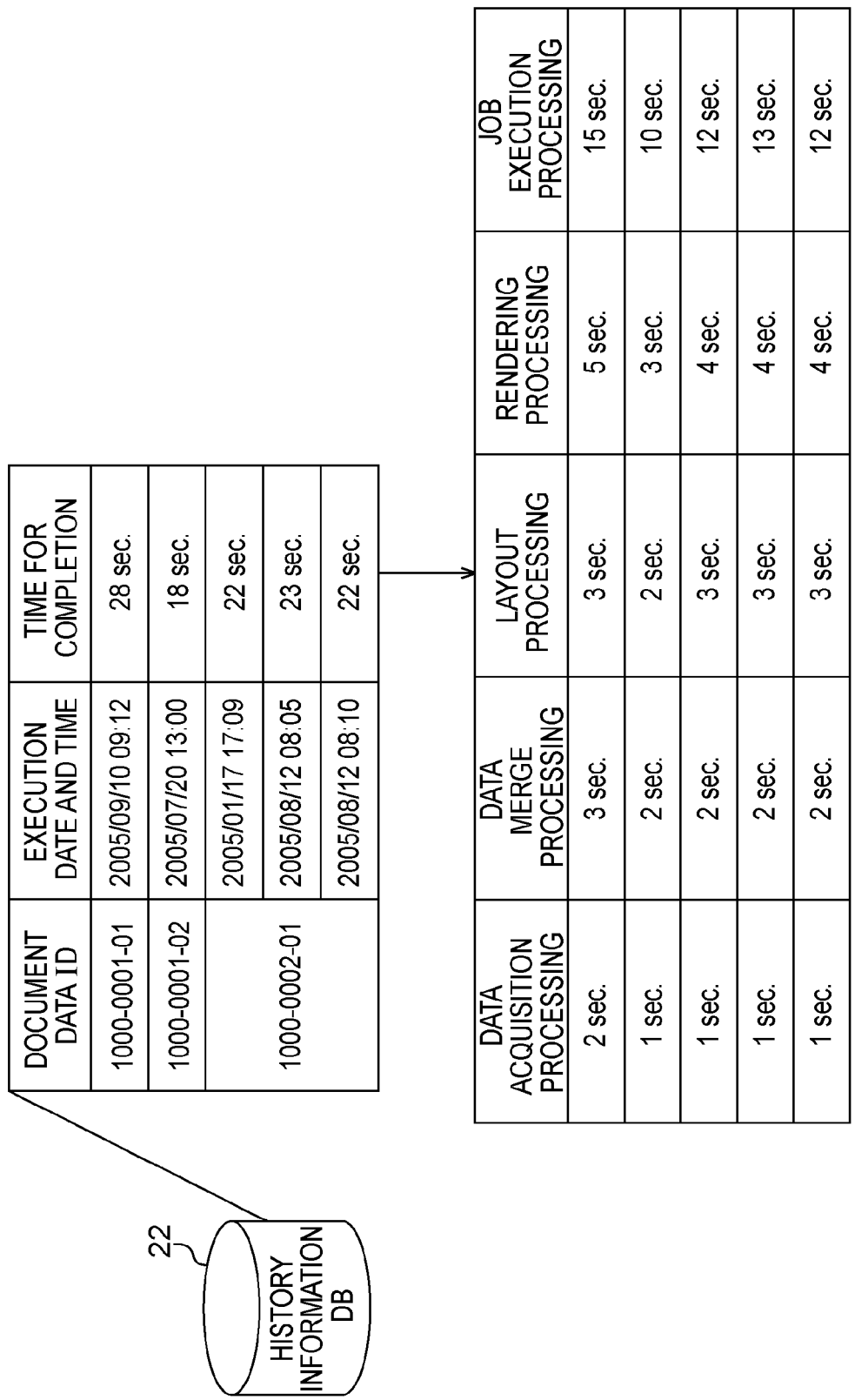
FIG. 8 is a diagram showing an example of a history information database according to the second embodiment of the present invention.

FIG. 8 is a diagram showing an example of the history information database 22 according to the second embodiment of the present invention. The history information database 22 stores the ID of the executed data (for example, the ID of data of a printed document), information about the execution date and time thereof, and information about the time taken to complete the processing of the data. The information about the time taken to complete the processing of the data includes information about not only the total time of all the processings but also the time taken to complete each processing (the data acquisition processing, data merge processing, layout processing, rendering processing, and job execution processing). With increasing number of executions of data, the amount of data stored in the database increases. Accordingly, data stored for a predetermined period may be deleted. If there is a plurality of pieces of data having the same ID, they may be averaged or one of the plurality of pieces of data may be overwritten with another piece of data.

Figure 9:
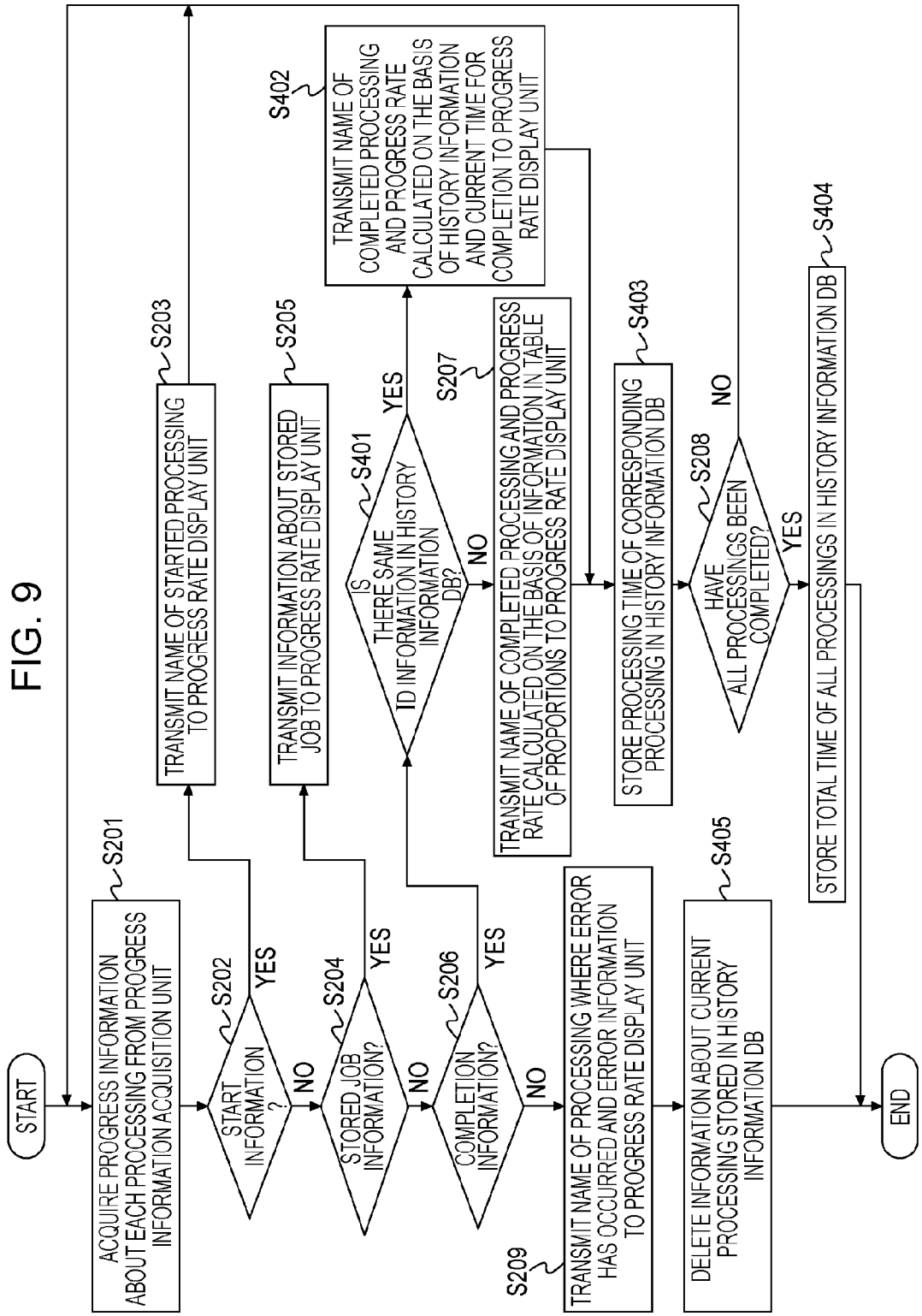
FIG. 9 is a flowchart showing a process performed by a progress rate calculation unit included in a progress display section according to the second embodiment of the present invention.

FIG. 9 is a flowchart showing a process performed by the progress rate calculation unit 20 included in the progress display section 18 according to the second embodiment of the present invention. The progress rate calculation unit 20 acquires progress information about each processing from the progress information acquisition unit 19 (step S201). If the acquired progress information is start information (Yes in step S202), the progress rate calculation unit 20 transmits the name of the started processing to the progress rate display unit 21 (step S203). If the acquired progress information is stored job information (Yes in step S204), the progress rate calculation unit 20 transmits the contents of the stored job to the progress rate display unit 21 (step S205).

If the acquired progress information is completion information (Yes in step S206), and if information about the same ID is stored in the history information database 22 (Yes in step S401), the progress rate calculation unit 20 calculates a progress rate by comparing the information stored in the history information database 22 with the time taken to complete the processing of the data having the ID this time, and transmits the calculated progress rate and the name of the completed processing to the progress rate display unit 21 (step S402). For example, if the time for completion stored in the history information database 22 is 18 seconds, and if the time taken to complete data acquisition processing this time is 1 second, the progress rate becomes 6 percent ($1/18=0.055$). This calculation method is merely an example, and other methods may be applied.

On the other hand, if information about the same ID is not stored in the history information database 22 (No in step S401), the progress rate calculation unit 20 calculates a progress rate on the basis of information in the table of proportions (FIG. 3), and transmits the calculated progress rate and the name of the completed processing to the progress rate display unit 21 (step S207). In addition, the progress rate calculation unit 20 stores the processing time of the completed processing in the history information database 22 (step S403). If all the processings have been completed (Yes in step S208), the total time of all the processings is stored in the history information database 22 (step S404), and then the process ends. If all the processings have not been completed (No in step S208), the information acquisition processing is repeated.

If the acquired progress information is neither the start information, the stored job information, nor the completion information (No in step S206), the acquired progress information can be considered to be error information. Accordingly, the progress rate calculation unit 20 transmits the name of the processing where the error has occurred and the error information to the progress rate display unit 21 (step S209). Subsequently, the progress rate calculation unit 20 deletes information about current processing stored in the history information database 22 (the processing time stored in step S403) (step S405), and then the process ends.

Third Embodiment

Next, the third embodiment of the present invention will be described. In the above-described first and second embodiments, the start and completion information about each processing are used to determine the overall progress status, but a user does not know how much progress has been made in each processing. If each processing is performed in parallel, it may be convenient for the user to know not only the overall progress rate but also how much progress has been made in each processing. In the third embodiment, the case will be described where both the progress status of each processing and the overall progress status are displayed at the same time when each processing is performed in parallel.

The third embodiment of the present invention will be described with reference to FIGS. 10 through 12. In the following description of the third embodiment, portions similar to or same as those described in the first embodiment will be omitted.

Figure 10:
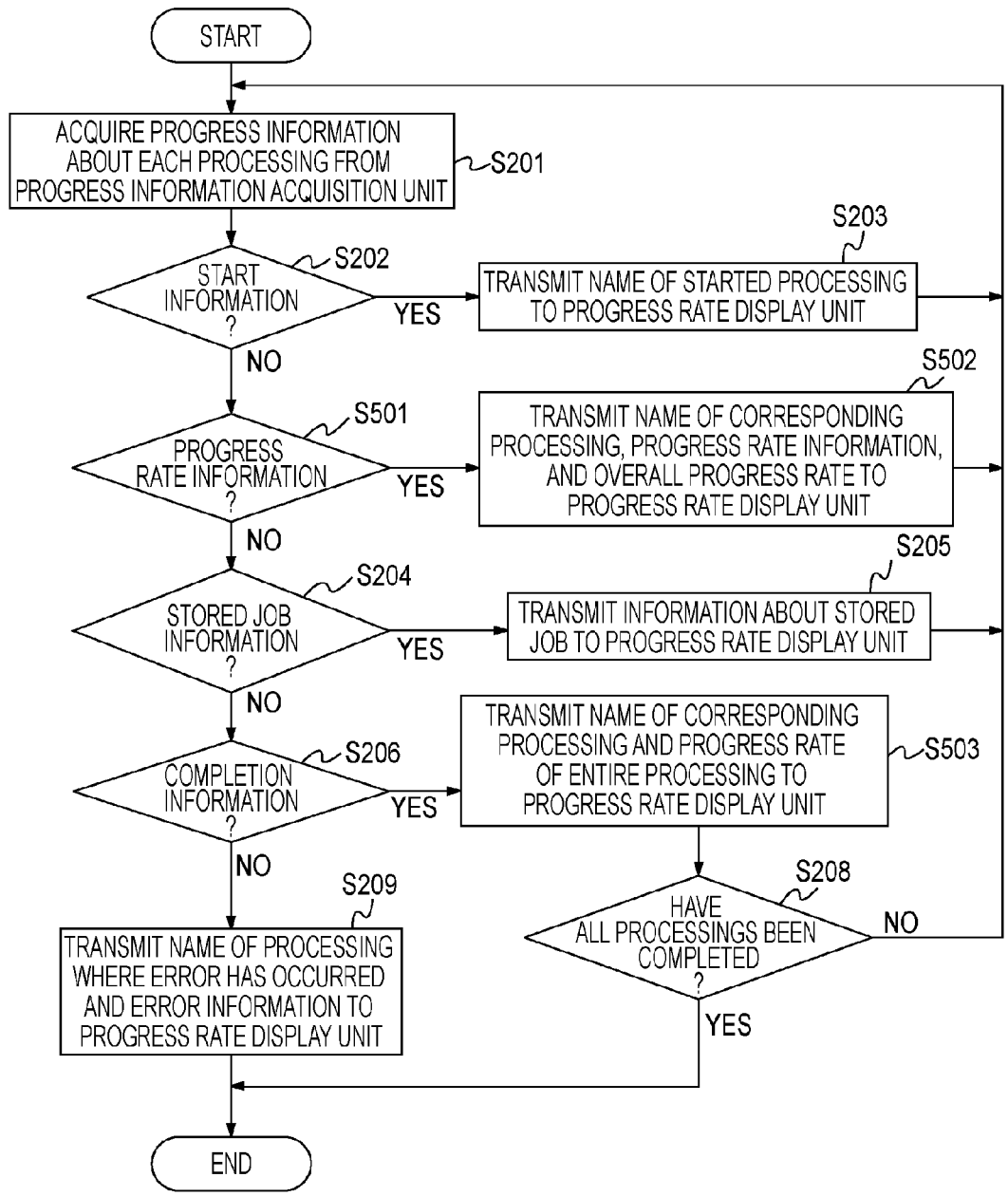
FIG. 10 is a flowchart showing a process performed by a progress rate calculation unit included in a progress display section according to a third embodiment of the present invention.

FIG. 10 is a flowchart showing a process performed by the progress rate calculation unit 20 included in the progress display section 18 according to the third embodiment of the present invention. The progress rate calculation unit 20 acquires progress information about each processing from the progress information acquisition unit 19 (step S201). If the acquired progress information is start information (Yes in step S202), the progress rate calculation unit 20 transmits the name of the started processing to the progress rate display unit 21 (step S203). If the acquired progress information is progress rate information (Yes in step S501), the progress rate calculation unit 20 calculates an overall progress rate on the basis of the information in the table of proportions (FIG. 3) and the progress rate information, and transmits the name of a corresponding processing, the progress rate information, and the calculated overall progress rate to the progress rate display unit 21 (step S502). If the acquired progress information is stored job information (Yes in step S204), the progress rate calculation unit 20 transmits the contents of the stored job to the progress rate display unit 21 (step S205).

If the acquired progress information is completion information (Yes in step S206), the progress rate calculation unit 20 calculates an overall progress rate on the basis of the information in the table of proportions (FIG. 3), and transmits the name of a corresponding processing, the completion information, and the calculated overall progress rate to the progress rate display unit 21 (step S503). In addition, if all the processings have been completed (Yes in step S208), the process ends. If all the processings have not been completed (No in step S208), the information acquisition processing is repeated.

If the acquired progress information is neither the start information, the stored job information, nor the completion information (No in step S206), the acquired progress information can be considered to be error information. Accordingly, the progress rate calculation unit 20 transmits the name of the processing where the error has occurred and the error information to the progress rate display unit 21 (step S209), and then the process ends.

Figure 11:
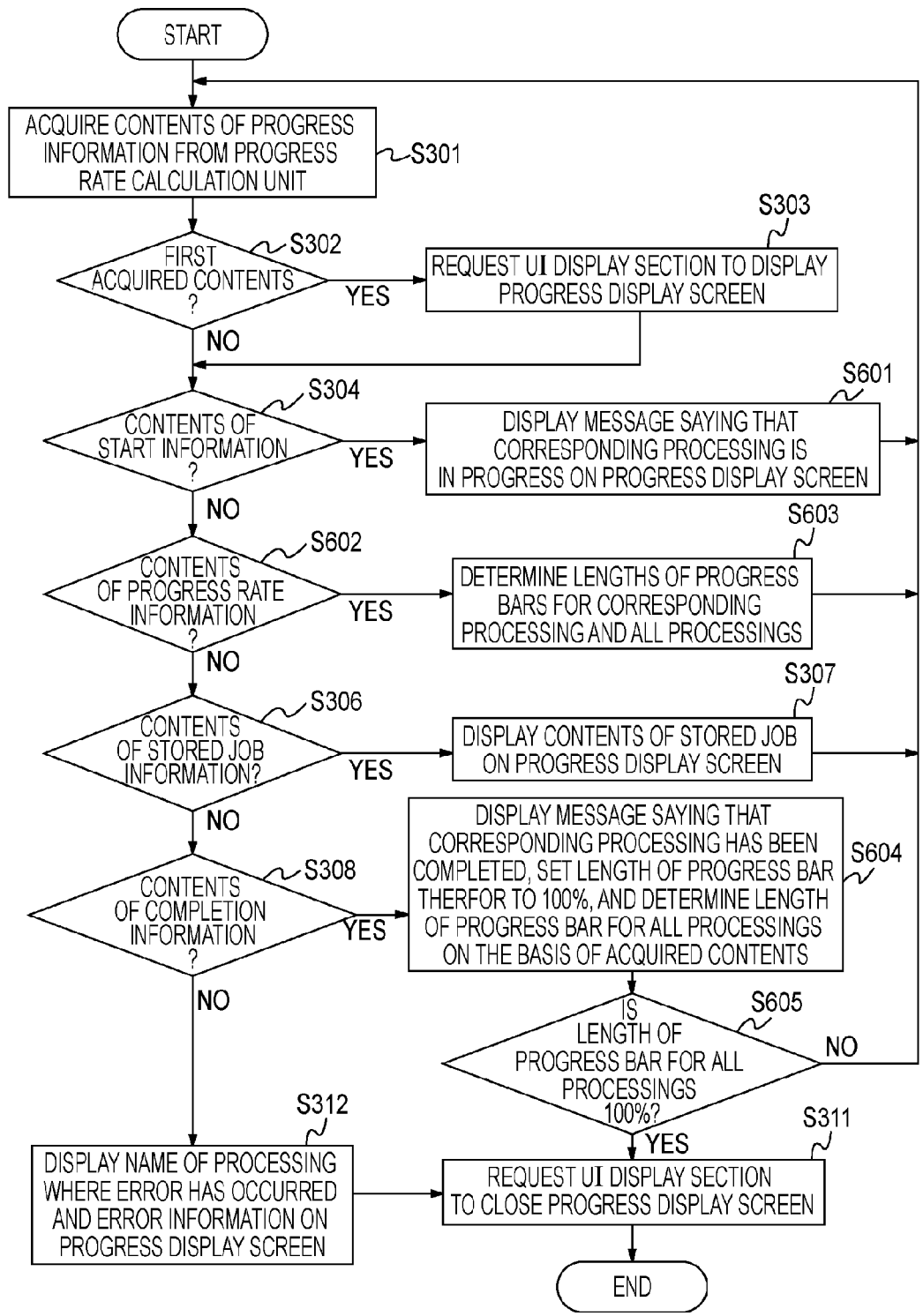
FIG. 11 is a flowchart showing a process performed by a progress rate display unit included in a progress display section according to the third embodiment of the present invention.

FIG. 11 is a flowchart showing a process performed by the progress rate display unit 21 included in the progress display section 18 according to the third embodiment of the present invention. The progress rate display unit 21 acquires the contents of progress information from the progress rate calculation unit 20 (step S301). If it is the first time the progress rate display unit 21 has acquired the contents of progress information (Yes in step S302), the progress rate display unit 21 requests the UI display section 11 to display a progress display screen (step S303). If it is not the first time the progress rate display unit 21 has acquired the contents of progress information (No in step S302), and if the acquired contents of progress information are the contents of start information (that is, the name of a started processing) (Yes in step S304), the progress rate display unit 21 displays a message saying that a corresponding processing is in progress on the progress display screen (step S601). If the acquired contents of progress information are the contents of progress rate information (the name of a corresponding processing, the progress rate information, and an overall progress rate) (Yes in step S602), the progress rate display unit 21 determines both the length of the progress bar for the corresponding processing and the length of the progress bar for all the processings on the basis of the acquired contents of progress information (step S603).

If the acquired contents of progress information are the contents of stored job information (Yes in step S306), the progress rate display unit 21 displays the contents of the stored job on the progress display screen (step S307). If the acquired contents of progress information are the contents of completion information (the name of a corresponding processing, the completion information, and an overall progress rate) (Yes in step S308), the progress rate display unit 21 displays a message saying that the corresponding processing has been completed, and sets the length of the progress bar therefor to 100%, and then determines the length of the progress bar for all the processings on the basis of the acquired contents of progress information (the overall progress rate) (step S604). In addition, if the length of the progress bar for all the processings reaches 100% (Yes in step S605), the progress rate display unit 21 requests the UI display section 11 to close the progress display screen after a predetermined time has elapsed (step S311), and then the process ends.

If the acquired contents of progress information are neither the contents of the start information, the stored job information, nor the completion information (No in step S308), the acquired contents can be considered to be the contents of error information. Accordingly, the progress rate display unit 21 displays the name of the processing where the error has occurred and the error information on the progress display screen (step S312), and requests the UI display section 11 to close the progress display screen after a predetermined time has elapsed (step S311), and then the process ends.

Figure 12:
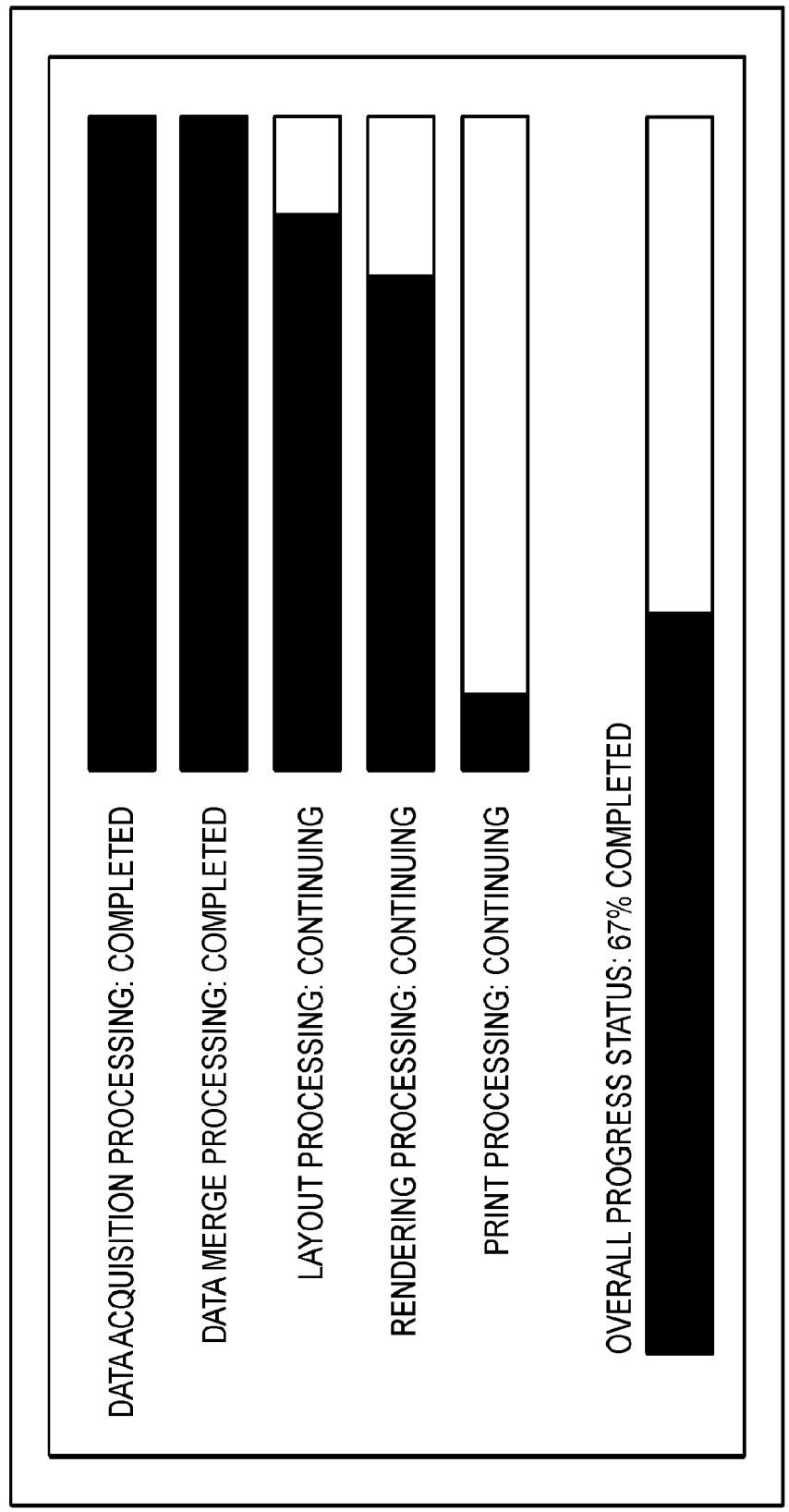
FIG. 12 is a diagram showing an exemplary progress display screen of a progress display system according to the third embodiment of the present invention.

FIG. 12 is a diagram showing an exemplary progress display screen of a progress display system according to the third embodiment of the present invention. Since a progress bar is displayed for each processing on the progress display screen, the progress rate of each processing can be known. In addition, a progress bar for all the processings is also displayed in which the progress statuses of individual processings are included. Referring to FIG. 12, each processing is performed in parallel, and the data acquisition processing and the data merge processing have been completed, and the layout processing, the rendering processing, and the print processing are in progress. The progress status of each processing is indicated as "completed" or "continuing", but may be indicated as a progress rate expressed in figures.

Thus, according to the first embodiment of the present invention, not only the progress statuses of individual processings performed in an application but also the overall progress information that includes the progress status of a job can be displayed in an embedded device such as a digital multifunction machine, whereby a user can easily know a current processing status. According to the second embodiment of the present invention, the use of history information about each type of processing enables a user to accurately know the current processing status. According to the third embodiment of the present invention, even if each processing is performed in parallel, a user can know not only the overall progress status but also the progress status of each processing at the same time.

The present invention may be achieved as follows. A storage medium storing the program code of software capable of achieving the functions of the above-described embodiments is provided to the system or apparatus. The program code is read out from the storage medium and is then executed by the computer of the system or apparatus, whereby the present invention can be achieved.

In this case, the program code itself read out from the storage medium achieves the functions of the above-described embodiments. Accordingly, the present invention can be applied to the program code and the storage medium storing the program code.

The storage medium for supplying the program code may be a flexible disk, a hard disk, an optical disc, a magneto-optical disk, a CD-ROM, a CD-R, a magnetic tape, a non-volatile memory card, or a ROM.

The above-described functions of embodiments may be achieved using other methods. An OS or the like running on a computer may perform a part of or all of the processing in accordance with the instructions of the program code read out by the computer, whereby the above-described functions of embodiments can be achieved.

Furthermore, the program code read out from the storage medium may be written in the memory of a feature expansion unit connected to a computer. Subsequently, a CPU performs the processing in accordance with the instructions of the program code, whereby the above-described functions of embodiments can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-308973 filed Oct. 24, 2005, which is hereby incorporated by reference herein in its entirety.

What is claimed is:

1. A method comprising:
performing a data processing including a data layout processing for laying out data by using a layout information and a data print processing for printing the data laid out in the data layout processing;
outputting a current progress status of the data layout processing, a current progress status of the data print processing, and a current progress status of the data processing including the data layout processing and the data print processing data; and
controlling the outputting to output a first progress status of the data processing representing a ratio between a processing being completed and a processing to be performed in a case where the data layout processing which uses first layout information is completed, and to output a second progress status of the data processing representing the ratio between the processing being completed and the processing to be performed in a case where the data layout processing which uses second layout information is completed,
wherein the data layout processing and the data print processing are performed in parallel, and the current progress statuses of the data layout processing and the data print processing are individually output.

2. The method according to claim 1, wherein the data processing comprises a data acquisition processing to externally acquire data.

3. The method according to claim 1, wherein the current progress status of the data processing is output based on proportion information about proportions of processing times taken to perform the data layout processing and to perform the data print processing.

4. The method according to claim 1, further comprising:
storing first information about time taken to complete the data layout processing which uses the first layout information and second information about time taken to complete the data print processing,
wherein the current progress status of the data processing is determined based on the stored first and second information in a case where the data layout processing which uses the first layout information is completed.

5. An apparatus comprising:
a data processing unit configured to perform a data processing including a data layout processing for laying out data by using layout information and a data print processing for printing the data laid out in the data layout processing;
a progress output unit configured to output a current progress status of the data layout processing, a current progress status of the data print processing, and a current progress status of the data processing including the data layout processing and the data print processing;
a storage unit configured to store a first parameter for first layout information and a second parameter for second layout information; and
a controlling unit configured to control the progress output unit to output a first progress status of the data processing representing a ratio between a processing being completed and a processing to be performed in accordance with the first parameter in a case where the data layout processing which uses the first layout information is completed, and to output a second progress status of the data processing representing the ratio between the processing being completed and the processing to be performed in accordance with the second parameter in a case where the data layout processing which uses the second layout information is completed,
wherein the data layout processing and the data print processing are performed in parallel, and the current progress statuses of the data layout processing and the data print processing are individually output.

6. The apparatus according to claim 5, wherein the data processing unit performs a data acquisition processing so as to externally acquire data.

7. The apparatus according to claim 5, wherein the progress output unit includes a storage unit configured to store proportion information about proportions of processing times taken to perform the data layout processing and to perform the data print processing, and outputs the current progress status of the data processing based on the proportion information.

8. The apparatus according to claim 5, wherein the progress output unit includes a storage unit configured to store first information about time taken to complete the data layout processing which uses the first layout information, and second information about time taken to complete the data print processing, and wherein the progress output unit outputs the current progress status of the data processing based on the first and second information stored in the storage unit in a case where the data layout processing which use the first layout information is completed.

9. A storage medium storing instructions which, when executed by an apparatus, causes the apparatus to perform operations comprising:
performing a data processing including a data layout processing for laying out data by using layout information and a data print processing for printing the data laid out in the data layout processing;
outputting a current progress status of the data layout processing, a current progress status of the data print processing, and a current progress status of the data processing including the data layout processing and the data print processing; and
controlling the outputting to output a first progress status of the data processing representing a ratio between a processing being completed and a processing to be performed in a case where the data layout processing which uses the first layout information is completed, and to output a second progress status of the data processing representing the ratio between the processing being completed and the processing to be performed in a case where the data layout processing which uses the second layout information is completed,
wherein the data layout processing and the data print processing are performed in parallel, and the current progress statuses of the data layout processing and the data print processing are individually output.

10. The storage medium according to claim 9, wherein the outputting of the current progress status comprises displaying the current progress status on a display screen.

11. The storage medium according to claim 9, wherein the data processing comprises a data acquisition processing so as to externally acquire data.

12. The storage medium according to claim 9, wherein the current progress status of the data processing is output based on information about proportions of processing times taken to perform the data layout processing and to perform the data print processing.

13. The storage medium according to claim 9, further comprising: storing first information about time taken to complete the data layout processing which uses the first layout information and second information about time taken to complete the data print processing, wherein the current progress status of the data processing is determined based on the stored first and second information in a case where the data layout processing which uses the first layout information is completed.

14. A method comprising:
performing a data processing including a data layout processing for laying out data by using layout information and a data print processing for printing the data laid out in the data layout processing; and
outputting a first progress status of the data processing representing a ratio between a processing being completed and a processing to be performed in a case where the data layout processing using first layout information is completed, and outputting a second progress status of the data processing representing the ratio between the processing being completed and the processing to be performed in a case where the data layout processing using second layout information is completed,
wherein the data layout processing and the data print processing are performed in parallel, and the current progress statuses of the data layout processing and the data print processing are individually output.

15. The method according to claim 14, further comprising acquiring processing information from a storage unit configured to store first processing information representing processing time of each processing of the data processing including data layout processing performed by using the first layout information, and to store second processing information representing processing time of each processing of the data processing including data layout processing performed by using the second layout information, wherein the outputting outputs the first progress status based on the first processing information in a case where the data layout processing using the first layout information is completed, and outputs the second progress status based on the second processing information in a case where the layout processing using the second layout information is completed.

16. A method comprising:
performing a data processing including a data layout processing for laying out data;
acquiring processing information from a storage unit configured to store first processing information representing a processing time of each processing of the data processing for first data and to store second processing information representing the processing time of each processing of the data processing for second data; and
outputting a first progress status representing a ratio between a processing being completed and a processing to be performed for the first data based on the first processing information in a case where the data layout processing for the first data is completed, and outputting a second progress status representing the ratio between the processing being completed and the processing to be performed for the second data based on the second processing information in a case where the data layout processing for the second data is completed,
wherein the data layout processing and the data print processing are performed in parallel, and the current progress statuses of the data layout processing and the data print processing are individually output.

* * * * *